Nov. 28, 1967     M. W. PAPP     3,354,764
TURNING TOOL
Filed Oct. 13, 1965
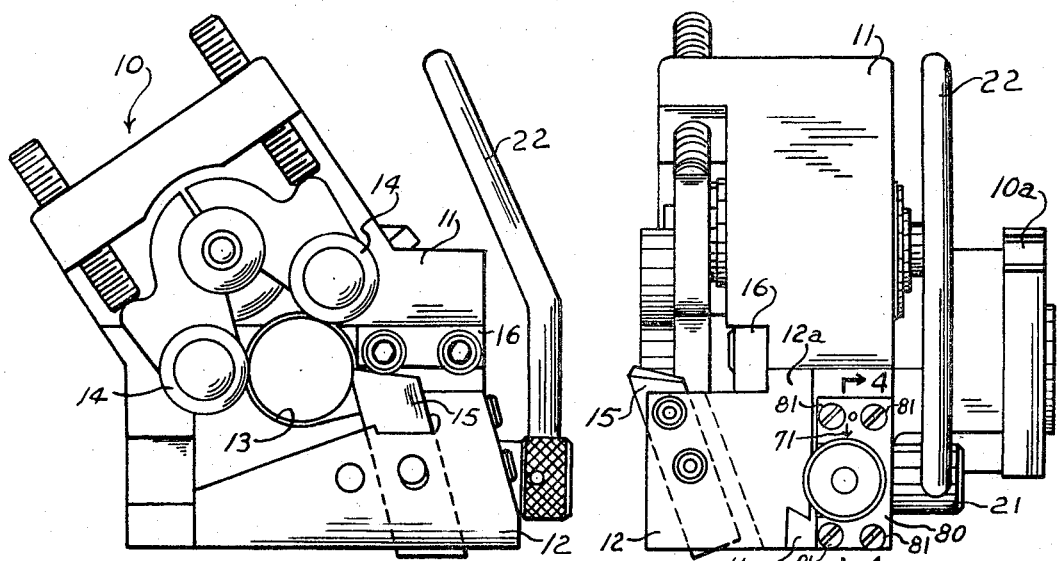
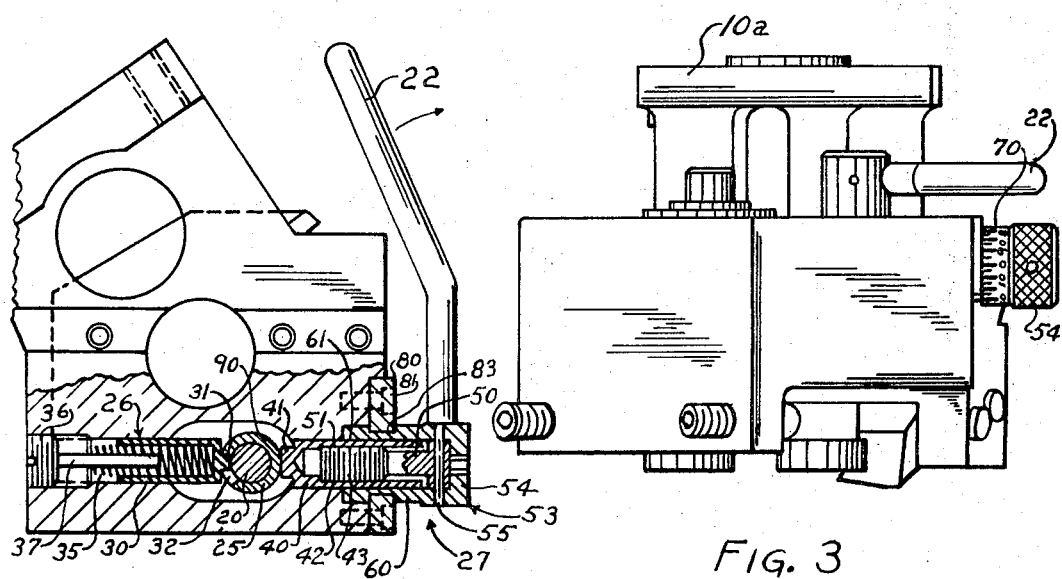
INVENTOR.
MICHAEL W. PAPP
BY
Hoffmann and Yount
ATTORNEYS

United States Patent Office 3,354,764
Patented Nov. 28, 1967

3,354,764
TURNING TOOL
Michael W. Papp, Cleveland, Ohio, assignor to The Warner & Swasey Company, Cleveland, Ohio, a corporation of Ohio
Filed Oct. 13, 1965, Ser. No. 495,546
4 Claims. (Cl. 82—24)

ABSTRACT OF THE DISCLOSURE

The tool has a body which is adapted to be supported on a tool slide, turret, or the like adjacent to a rotating workpiece. The tool body supports a tool carrying slide for sliding movement relative to the body transversely of the axis of rotation of the workpiece. Spring means operatively engage the slide to bias the slide in a direction away from the axis of the workpiece. The spring means is opposed by an axially adjustable abutment member which limits the extent to which the spring means can move the slide to thereby adjust the position of the tool with respect to the workpiece. The abutment member is adjusted axially by a manually engageable knob provided with indicia means to permit precise adjustment of the abutment member. A manually rotatable lever is provided to permit the spring means to shift the slide to move the tool out of its adjusted position provided by said abutment member and away from the workpiece.

---

The present invention relates to a tool, and particularly to a turning tool which includes a body member adapted to be supported adjacent a rotating workpiece and a slide member which carries a cutting tool for engaging the workpiece and which is supported by the body member for movement transversely of the axis of rotation of the workpiece.

The principal object of the present invention is the provision of a new and improved tool which includes a body member adapted to be supported adjacent a rotating workpiece and which carries a slide member adapted to support a cutting tool and which is movable relative to the body member transverse to the axis of rotation of the workpiece, and wherein the slide member may be moved transverse to the axis of the workpiece by means which is simple in construction, reliable, and provides for accurately positioning the slide member and cutting tool relative to the workpiece.

A more specific object of the present invention is the provision of a new and improved tool wherein the slide member is movable relative to the rotating workpiece upon movement of a reciprocating member, and the reciprocating member is reciprocated by operation of a manually movable control member, and wherein indicia carried on the control member are movable relative to indicia carried on the body of the tool, and wherein means is provided for constraining the movable control member for movement so that the indicia thereon move in one plane only relative to the indicia on the body member.

A further object of the present invention is the provision of a new and improved tool wherein the slide member is movable relative to a body member by means of a spring and an abutment engages a part connected with the slide member and limits movement of the slide member by the spring, and wherein the abutment is movable by a micrometer adjustment means which includes indicia means on a control member movable relative to indicia carried by the body member, and wherein means is provided for constraining the movable control member to cause the indicia means thereon to move in one plane only relative to the indicia on the body member.

A still further object of the present invention is the provision of a new and improved tool, as noted in the next preceding paragraph, wherein the means for constraining the movement of the control member comprises a block member having a portion located in a peripheral groove in a sleeve portion of the control member and wherein the control member is rotatable and the block member prevents axial movement of the control member.

Another object of the present invention is the provision of a new and improved tool which includes a body and a slide member movable relative to the body and transverse to the axis of rotation of the workpiece, and wherein the slide member is movable relative to the workpiece in response to reciprocating movement of a reciprocating member and the reciprocating member has an internally threaded sleeve portion cooperable with a threaded pin member which is connected to a rotatable manually engageable control member so that rotation of the control member effects rotation of the pin member and reciprocation of the reciprocating member.

Further objects and advantages of the present invention will be apparent to those skilled in the art to which it relates from the following detailed description of the preferred embodiment thereof made with reference to the accompanying drawings forming a part of this specification and in which:

FIG. 1 is a front elevational view of a turning tool embodying the present invention and looking at the tool along the axis of rotation of the workpiece;

FIG. 2 is a view of the turning tool of FIG. 1 looking at the turning tool of FIG. 1 from the right;

FIG. 3 is a top elevational view of the turning tool shown in FIG. 1; and

FIG. 4 is a view of the turning tool of FIG. 1 showing a part thereof in section, taken approximately along the section line 4—4 of FIG. 2.

The present invention provides an improved tool for supporting a cutting implement or tool to engage a rotating workpiece so as to turn or cut the workpiece as the workpiece rotates relative thereto. A tool embodying the present invention is supported for movement relative to the workpiece along the axis thereof and incorporates means for moving the cutting tool transversely to the axis of rotation of the workpiece for adjustment purposes, as will be described hereinbelow.

As representing the preferred embodiment of the present invention, the drawings illustrate a turning tool 10 embodying the present invention. The turning tool 10 comprises a tool body member 11. The body member 11 has a flange portion 10a adapted to engage and be secured to a machine tool slide or turret, as is well known, so as to be movable with the turret. The body member 11 has an opening 13 therethrough through which a rotating workpiece extends. The body member 11 carries suitable backup rolls 14 for engaging the rotating workpiece and supporting the workpiece in position in the tool 10.

The tool 10 also includes a slide member 12 or cutter block supported by the body member 11 for movement transversely of the axis of rotation of the workpiece. The slide member 12 or cutter block carries a cutting tool 15 which engages the rotating workpiece to cut or turn the workpiece. The slide member or cutter block 12 has a portion 12a which is received in a slide or guideway defined by a portion 11a of the body member 11 and a gib member 16 which is secured to the body member 11. The slide 12 is movable, as noted above, transverse to the direction of rotation of the workpiece and the portion 12a of the cutter block 12 is movable relative to the gib 16 and portion 11a of the body 11.

The cutter block 12 includes a projecting pin member 20 which projects away from the portion 12a of the cutter block and in a direction parallel to the axis of rotation of the workpiece. The pin member 20 carries a bushing or cam sleeve 25 which is rotatably supported thereon. The cam sleeve 25 is connected with a manually actuated lever member 22 for rotation about the axis of the pin 20 upon movement of the lever member 22, for a purpose to be described hereinbelow.

The cutter block 12 is moved transversely of the axis of rotation of the workpiece by the cooperative action of a spring-biased plunger mechanism 26 and an accurate positioning or micrometer adjustment mechanism 27. The spring-biased plunger mechanism 26 acts against the pin member 20 to bias the pin member 20 in a direction to the right, as viewed in FIG. 4, thereby biasing the cutter block 12 in a direction away from the workpiece. The positioning mechanism 27 acts in opposition to the plunger mechanism to limit movement of the pin member 20 and thus movement of the cutter block 12 in the direction toward the right, as viewed in FIG. 4, and to positively effect movement of the cutter block toward the workpiece, namely, toward the left as viewed in FIG. 4.

The spring-biased plunger mechanism 26 includes a plunger member 30. The plunger member 30 has an actuating tip or portion 31 which is located in a slot or groove 32 in the cam sleeve 25, and specifically engages the outer surface of the pin member 20. The plunger member 30 is hollow and a spring member 35 is positioned therein. The spring member 35 at one end engages the plunger member 30 at the outer end thereof adjacent the tip portion 31. The other end of the spring member 35 engages a plug member 36 which is threaded into the body 11 of the tool. The plug member 36 includes a projecting portion 37 which projects into the interior of the spring member 35 and acts as a guide therefor. From the above, it should be apparent that the spring member 35 acting through the plunger member 30 biases the pin member 20 and thereby biases the cutter block 12 toward the right, as viewed in FIG. 4, and away from the workpiece. The force applied by the spring is sufficient to move the cutter block 12 relative to the body 11 and may be adjusted by threading the plug 36 more or less into the body 11.

As noted above, the micrometer adjustment mechanism 27 acts in opposition to the mechanism 26 and, specifically, acts against the bias of the spring member 35. The micrometer adjustment mechanism 27 includes a movable abutment member 40. The movable abutment member 40 is a reciprocable member and includes a portion 41 which engages the cam sleeve 25 diametrically opposite the engagement of the pin member 20 with the tip portion 31 of the plunger member 30. The reciprocable abutment member 40 is movable toward and away from the pin 20 and when moved toward the pin member 20 to the left, as viewed in FIG. 4, will effect movement of the pin member 20 and the cutter block 12 toward the workpiece, whereas movement of the abutment member 40 toward the right, as viewed in FIG. 4, will cause the spring member 35 through the plunger member 30 to effect movement of the pin member 20 and cutter block 12 toward the right, as viewed in FIG. 4, and away from the workpiece. Thus, it should be clear that reciprocation of the abutment member 40, either toward or away from the pin member 20, will effect movement of the cutter block 12, and thus the abutment member 40 provides for the positioning of the cutter block 12 and the tool carried thereby relative to the workpiece.

The abutment member 40 includes a hollow sleeve portion 42. The sleeve portion 42 is internally threaded at 43 throughout a substantial length thereof. A pin member 50 projects into the internally threaded sleeve portion 42 and has an enlarged threaded portion 51 having threads in cooperating mesh with the threads at 43 on the sleeve portion 42 of the abutment member 40.

The pin member 50 is connected to a manually actuatable control member 53. The control member 53 is supported by the body member 11 for rotation therein, and includes a manually engageable knob portion 54. A pin member 55 extends transversely of the knob portion 54 and through an opening in the pin 50. It should be apparent from this description that upon rotation of the knob portion 54, the pin member 55 effects rotation of the pin member 50 which will likewise be rotated, and the abutment member 40 will be reciprocated toward or away from the pin member 20 depending upon the direction of rotation of the knob portion 54.

The control member 53 includes a sleeve portion 60 projecting from the knob portion 54 thereof. The sleeve portion 60 projects into an opening 61 in the body member 11 of the tool and is rotatably supported thereby. The sleeve portion 60 thereof is hollow and receives the outermost end of the sleeve portion 42 of the abutment member 40. This construction provides a seal preventing dirt and other foreign matter from fouling the threaded engagement between the threaded portion 51 of the pin and the threads at 43 of the sleeve portion of the abutment member.

The outer peripheral surface of the sleeve portion 60 of the member 53 includes suitable indicia means, best shown in FIG. 3, and designated 70 in the drawings. The indicia means 70 is located on this outer surface of the member 53 and movable upon movement of the member 53. The indicia means 70 moves relative to indicia means 71, shown in FIG. 2 and supported on the body member 11 of the tool. The indicia means 70 is adapted to cooperate with the indicia 71 and are calibrated to indicate a predetermined amount of movement of the cutter block 12, and provide for an accurate positioning of the abutment member 40 relative to the pin 20 to thereby provide for accurate positioning of the cutting tool.

Suitable means is provided in association with the sleeve portion 60 of the manually engageable control member 53 so as to constrain the manually engageable control member 53 for movement so that the indicia means 70 mounted thereon move only in one plane relative to the indicia means 71 on the body 11. The means for so constraining the member 53 includes a suitable block or track member, designated 80. The member 80 is a U-shaped block member having a central opening therethrough and through which the sleeve portion 60 of the manually actuatable control member 53 projects. The U-shaped block member 80 is secured to the body 11 by means of suitable fasteners 81. The indicia means 71 is carried on the outer face of the block member 80. The block member 80 includes an inner portion located in and closely fitting a peripheral groove 83 formed in the circumference of the sleeve portion 60 of the manually actuatable control member 53. The legs of the U-shaped block member are spaced a distance apart substantially equal to the cross-sectional dimension of the control member 53 at the groove 83 therein. The groove 83 is sized so as to snugly receive the member 80. The block member 80, of course, permits rotation of the control member 53, but prevents axial movement thereof.

Thus, it should be clear from the above description that the indicia means 70 does not move axially relative to the indicia means 71. This provides for accurate positioning of the indicia 70 relative to the indicia 71 which results in accurate positioning of the cutter block 12 relative to the workpiece. Moreover, it should be apparent that the member 80 holds and constrains the manually actuatable control member 53 from axial movement relative to the body member and upon rotation of the manually actuatable control member 53, the pin member 50 and specifically the threaded portion of the pin member cause reciprocating movement of the abutment member 40 toward or away from the pin member 20, as described hereinbelow.

While it should be apparent that the tool 10, as described hereinabove, does provide for accurate positioning of the cutting tool with respect to the workpiece, the tool 10 is constructed so as to permit movement of the cutter block 12 out of cutting position upon movement of the manually actuated lever member 22 described above. As noted hereinabove, the lever member 22 is connected to the cam sleeve or bushing 25 and when moved about the axis of the pin member in the direction of the arrow shown in FIG. 4, effects movement of the cam sleeve or bushing 25 relative to the pin member 20. The cam sleeve 25 has a flat surface portion 90 thereon which is moved into engagement with the abutment member 40 when the lever 22 is moved in the direction of the arrow shown in FIG. 4. The slot 32 permits movement of the sleeve 25 relative to plunger 30. Specifically, the flat surface portion 90 of the cam is moved opposite the abutment member 40, and the spring member 35 causes the pin member to move toward the right, as viewed in FIG. 4, to cause the surface portion 90 to engage the tip of the abutment member. This, of course, results in movement of the cutter block 12 away from the workpiece, thereby moving the cutting tool 15 out of engagement with the workpiece. When this movement occurs, the tool 10 may then be bodily moved relative to the workpiece without engagement of the cutting tool with the workpiece.

It should be further apparent that the present invention has been described in great detail hereinabove and that certain modifications, changes, and adaptations may be made therein by those skilled in the art to which it relates and it is hereby intended to cover all such modifications, changes, and adaptations which come within the scope of the appended claims.

Having described my invention, I claim:

1. A tool comprising a body member adapted to be supported adjacent a rotating workpiece, a slide member adapted to support a cutting tool and carried by said body member for movement relative thereto transverse to the axis of rotation of the workpiece, an axially movable member carried by said body member and engageable with a portion of said slide member to provide for movement of said slide member upon movement of said axially movable member, a manually rotatable control member operatively connected with said axially movable member to effect movement thereof, said control member having a sleeve portion projecting into an opening in the body portion of said tool, and said axially movable member having a hollow sleeve portion slidably received in said sleeve portion of said control member, and means enclosed within said relatively axially movable sleeve portions and connecting said sleeve portion of said axially movable member with said sleeve portion of said control member to provide for axial movement of said sleeve portion of said axially movable member in response to rotation of said sleeve portion of said control member.

2. A tool as defined in claim 1 wherein said means connecting said sleeve portions comprises internal threads on said sleeve portion of said axially movable member, and a threaded member enclosed within said sleeve portions and in threaded engagement with said internal thread and means connecting said threaded member for rotation with said sleeve portion of said control member.

3. A tool comprising a body member adapted to be supported adjacent a rotating workpiece, a slide member adapted to support a cutting tool and carried by said body member for movement relative thereto transverse to the axis of rotation of the workpiece, spring means biasing said slide member away from the workpiece, a reciprocating abutment member carried by said body member and operatively connected with a portion of said slide member to provide for movement of said slide member upon reciprocation thereof, a rotatable control member, means for reciprocating said abutment member in response to rotation of said control member, first indicia means on said body member, second indicia means on said rotatable control member and rotatable relative to said first indicia means, and means for constraining said rotatable control member for rotation only to cause said second indicia means to rotate in one plane only relative to said first indicia means, said rotatable control member includes a sleeve portion which extends into an opening in said body portion and said abutment member includes a sleeve portion which extends into the sleeve portion of said control member, said rotatable control member has a pin member projecting therefrom and located in the sleeve portion thereof and which projects into said sleeve portion of said abutment member, and wherein said sleeve portion of said abutment member includes internal threads and said pin member has external threads thereon which cooperate with said internal threads to effect reciprocating movement of the abutment member upon rotation of said pin member.

4. A tool as defined in claim 3 wherein said abutment member engages a cam sleeve having a surface portion which is movable into engagement with the abutment member, lever means for rotating said cam sleeve so as to position said cam surface facing said abutment member.

References Cited
UNITED STATES PATENTS

| | | | |
|---|---|---|---|
| 2,154,496 | 4/1939 | Darash | 82—35 X |
| 2,311,211 | 2/1943 | Class | 82—35 |
| 2,389,853 | 11/1945 | Harris | 82—35 |
| 2,158,798 | 5/1939 | Lange et al. | 82—35 |

LEONIDAS VLACHOS, *Primary Examiner.*